(12) United States Patent
Ho et al.

(10) Patent No.: US 9,247,440 B2
(45) Date of Patent: Jan. 26, 2016

(54) AUTOMATIC CONFIGURATION OF A NETWORK DEVICE

(71) Applicant: QUALCOMM Incorporated, San Diego, CA (US)

(72) Inventors: Sai Yiu Duncan Ho, San Diego, CA (US); Peerapol Tinnakornsrisuphap, San Diego, CA (US); Etan Gur Cohen, San Francisco, CA (US); Bibhu Prasad Mohanty, San Diego, CA (US); Brian Michael Buesker, San Diego, CA (US); Rajesh Kumar, San Diego, CA (US); Anthony James Cowan, Ocala, FL (US)

(73) Assignee: QUALCOMM Incorporated, San Diego, CA (US)

( * ) Notice: Subject to any disclaimer, the term of this patent is extended or adjusted under 35 U.S.C. 154(b) by 257 days.

(21) Appl. No.: 13/968,050

(22) Filed: Aug. 15, 2013

(65) Prior Publication Data

US 2015/0049616 A1    Feb. 19, 2015

(51) Int. Cl.
| | | |
|---|---|---|
| H04W 24/02 | (2009.01) | |
| H04W 28/18 | (2009.01) | |
| H04W 88/08 | (2009.01) | |
| H04W 88/16 | (2009.01) | |

(52) U.S. Cl.
CPC ............. *H04W 24/02* (2013.01); *H04W 28/18* (2013.01); *H04W 88/08* (2013.01); *H04W 88/16* (2013.01)

(58) Field of Classification Search
None
See application file for complete search history.

(56) References Cited

U.S. PATENT DOCUMENTS

| | | | |
|---|---|---|---|
| 7,808,959 B2 * | 10/2010 | Guo | .............................. 370/338 |
| 8,332,914 B2 | 12/2012 | Buddhikot et al. | |

| | | | |
|---|---|---|---|
| 2003/0065757 A1 | 4/2003 | Mentze et al. | |
| 2003/0126248 A1 | 7/2003 | Chambers | |
| 2004/0103282 A1* | 5/2004 | Meier et al. | .................... 713/171 |
| 2004/0133689 A1 | 7/2004 | Vasisht | |
| 2008/0112430 A1* | 5/2008 | Kwon et al. | ................... 370/445 |
| 2011/0007705 A1 | 1/2011 | Buddhikot et al. | |

(Continued)

FOREIGN PATENT DOCUMENTS

| | | |
|---|---|---|
| EP | 1983775 A1 | 10/2008 |
| EP | 2426829 A1 | 3/2012 |
| TW | 201322816 | 6/2013 |
| WO | 2007055994 A2 | 5/2007 |
| WO | 2012146683 A1 | 11/2012 |
| WO | WO 2012146683 A1 * | 11/2012 |

OTHER PUBLICATIONS

"International Application Number PCT/US2013/070829 International Search Report and Written Opinion", Apr. 17, 2014, 11 pages.
Co-Pending U.S. Appl. No. 14/094,089, filed Dec. 2, 2013, 75 pages.
"Taiwan Application No. 102142682 Office Action", Mar. 9, 2015, 4 pages.
"Taiwan Application No. 102142682 Search Report", Mar. 5, 2015, 1 page.

*Primary Examiner* — Benjamin H Elliott, IV
(74) *Attorney, Agent, or Firm* — DeLizio Law, PLLC

(57) ABSTRACT

A hybrid device can implement functionality to automatically configure itself to form a home network with other network devices. If it is determined that the hybrid device is the central access point of a hybrid network, operating parameters are determined for the central access point. The central access point can then operate in conjunction with other non-CAP hybrid devices of the hybrid device to determine how to configure the non-CAP hybrid device. The configuration of the non-CAP hybrid device can be determined based, at least in part, on a communication link performance measurement between the CAP and the non-CAP hybrid device. Furthermore, the hybrid network can also be monitored to ensure that the hybrid devices do not repeatedly or randomly switch between different configurations.

42 Claims, 6 Drawing Sheets

(56) References Cited

U.S. PATENT DOCUMENTS

| | | | |
|---|---|---|---|
| 2011/0264915 A1* | 10/2011 | Cam-Winget et al. | 713/171 |
| 2012/0040705 A1* | 2/2012 | Shindo | 455/509 |
| 2012/0063327 A1* | 3/2012 | Sakai | 370/242 |
| 2012/0214441 A1 | 8/2012 | Raleigh | |
| 2012/0320919 A1 | 12/2012 | Baliga et al. | |
| 2012/0329505 A1 | 12/2012 | Takagi | |
| 2013/0002409 A1* | 1/2013 | Molina et al. | 340/12.32 |
| 2013/0007855 A1* | 1/2013 | Bennett | 726/5 |
| 2015/0049616 A1* | 2/2015 | Ho et al. | 370/252 |

* cited by examiner

AUTOMATIC CONFIGURATION OF A NETWORK DEVICE

BACKGROUND

Embodiments of the inventive subject matter generally relate to the field of communication networks and, more particularly, for automatic configuration of a network device.

Hybrid communication networks typically comprise multiple network devices that implement multiple networking technologies (e.g., wireless local area network (WLAN) technologies, powerline communication technologies, Ethernet, etc.). Typically, the communication mechanisms and protocol specifics (e.g., device and topology discovery, bridging to other networks, etc.) are unique to each networking technology. The multiple networking technologies are typically interconnected using bridging-capable devices that forward frames between the different network technologies and media to form a single, extended communication network. Hybrid communication networks typically present multiple frame delivery routes between any two hybrid devices.

SUMMARY

Various embodiments for automatic configuration of a network device are disclosed. In one embodiment, a network device determines whether it is a central access point of a communication network, where the central access point is coupled to a gateway of the communication network via a first communication interface and is coupled to another network device via at least a second communication interface. In response to determining that the network device is the central access point of the communication network, an operating parameter is determined for the network device configured as the central access point. In response to determining that the network device is not the central access point of the communication network, it is determined how to configure the network device based, at least in part, on a performance measurement at the network device.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

Figure 1:
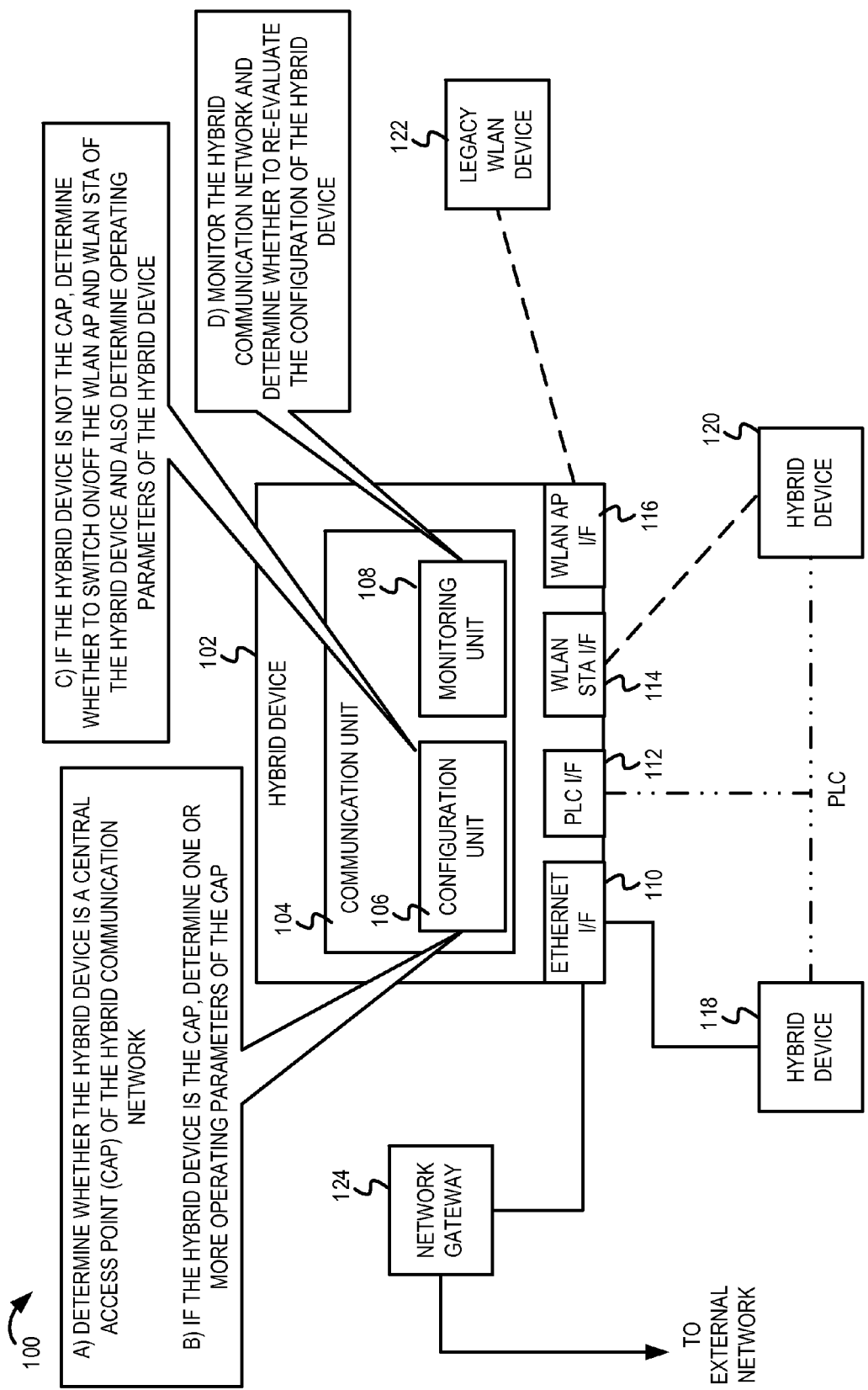
FIG. 1 is a conceptual diagram of an example hybrid communication network including a mechanism for automatic configuration of a hybrid device.

The description that follows includes exemplary systems, methods, techniques, instruction sequences, and computer program products that embody techniques of the present inventive subject matter. However, it is understood that the described embodiments may be practiced without these specific details. For instance, although examples refer to configuration of wireless local area network (WLAN) interfaces (e.g., IEEE 802.11 compatible interfaces) of a hybrid device, embodiments are not so limited. In other embodiments, the configuration techniques described herein can be extended to network interfaces that implement other suitable communication protocols and standards (e.g., power line communication (PLC) interfaces, such as HomePlug® AV interfaces, etc.). Although examples refer to operations for configuring a hybrid device with multiple network interfaces, embodiments are not so limited. In other embodiments, the configuration operations described herein can also be applied to legacy devices (e.g., network devices with a single network interface), such as legacy WLAN devices and/or legacy PLC devices. Although examples refer to automatically configuring a hybrid device in a home network, in other embodiments, operations for automatically configuring a hybrid device can be executed in other network environments, such as an office, school, train station network, etc. In other instances, well-known instruction instances, protocols, structures, and techniques have not been shown in detail in order not to obfuscate the description.

In a communication network (e.g., a home network) that comprises multiple hybrid devices, each hybrid device may support multiple network interfaces (e.g., a combination of physical (PHY) layer and media access control (MAC) layer) that couple the hybrid device to corresponding multiple communication network segments or access technologies (e.g., Ethernet, WLAN, multimedia over coax alliance (MoCA®), Ethernet over coax (EoC), PLC, etc.). Additionally, WLAN-capable hybrid devices (e.g., hybrid devices that support WLAN communication) may have different hardware capabilities (e.g., 2.4 GHz and/or 5 GHz WLAN support, dual band single radio, dual band dual concurrent radio, etc.). Furthermore, it may be possible to configure each WLAN-capable hybrid device in the home network differently depending on the hardware capabilities and interconnection with other network devices in the home network. It may be difficult and cumbersome for a user to: 1) determine how each network interface of each hybrid device in the home network should be configured, and 2) manually configure each network interface of each hybrid device in the home network for optimal performance of the hybrid devices and the home network.

In some embodiments, a hybrid device ("TCA-capable hybrid device") can be configured to execute a total configuration algorithm (TCA) described herein so that the hybrid device configures itself automatically to form a communication network (e.g., an IEEE Std 1905.1 hybrid communication network) with other network devices with minimal or zero user interventions. A configuration unit of the hybrid device can determine and control the behavior of a hybrid device during its initialization and its operation. For example, as will be further described below, the configuration unit can determine the personality of the hybrid device (e.g., the configuration of a WLAN access point (AP) module and/or a WLAN station (STA) module of the hybrid device), the WLAN communication band and channel in which the WLAN AP module and/or the WLAN STA module of the hybrid device should operate, the security credentials of the WLAN AP module and/or the WLAN STA module of the hybrid device, the transmit power level of the WLAN AP module of the hybrid device, and the configuration of bridges (e.g., flooding behavior) between various interfaces of the hybrid device. In some embodiments, the personality of the hybrid device can refer to whether to switch ON/OFF the WLAN AP module and/or the WLAN STA module of the hybrid device, as will be further described below. Automatic configuration of the hybrid device can enable good/reliable connectivity to the hybrid device, minimize interference on the WLAN communication band (e.g., the 2.4 GHz and/or 5 GHz WLAN communication band), configure access points in the hybrid communication network to use different communication channels (if possible), maximize WLAN coverage (and connectivity) in the hybrid communication network (e.g., a home network), and maximize the capacity of the hybrid communication network (e.g., WLAN coverage may be provided everywhere in the home network). The automatic configuration of the hybrid device can enable the user to plug in (or connect) the hybrid devices in random order and in unpredictable locations. The hybrid devices can self-organize among themselves to discover each other and configure their personalities without user intervention. Furthermore, the hybrid communication network can also be monitored to ensure that the hybrid devices do not repeatedly or randomly switch between decisions on personality, channel, and power selections, etc.

FIG. 1 is a conceptual diagram of an example hybrid communication network 100 including a mechanism for automatic configuration of a hybrid device 102. The hybrid communication network 100 comprises hybrid devices 102, 118, and 120, a legacy WLAN device 122, and a network gateway 124. The hybrid device 102 comprises a communication unit 104. The communication unit 104 comprises a configuration unit 106 and a monitoring unit 108. The hybrid devices 102, 118, and 120 comprise multiple network interfaces that utilize a plurality of communication protocols (which may also be referred to as access technologies) to couple the hybrid device to a plurality of communication networks. For example, as depicted in FIG. 1, the hybrid device 102 comprises four network interfaces—an Ethernet interface 110, a PLC interface 112, a WLAN client station ("WLAN STA") interface 114, and a WLAN access point ("WLAN AP") interface 116. Hybrid devices 102, 118, and 120 can comprise any suitable number and type of network interfaces. The legacy WLAN device 122 comprises a single WLAN interface that couples the legacy WLAN device 122 to the WLAN segment. However, the hybrid communication network 100 can comprise other suitable types of legacy network devices that comprise a single type of network interface that couple the legacy network device to a corresponding single communication network segment (or access technology). In the specific example of FIG. 1, the Ethernet interface 110 of the hybrid device 102 is coupled with an Ethernet interface (not shown) of the hybrid device 118 and with the network gateway 124. The network gateway 124 couples the hybrid communication network 100 (e.g., a home network) to an external communication network (e.g., the Internet). In the specific example of FIG. 1, the PLC interface 112 of the hybrid device 102 is coupled with a PLC interface (not shown) of the hybrid device 118 and a PLC interface (not shown) of the hybrid device 120. The WLAN STA interface 114 of the hybrid device 102 is coupled with a WLAN AP interface (not shown) of the hybrid device 120, while the WLAN AP interface 116 of the hybrid device is coupled with the legacy WLAN device 122 (e.g., configured as a STA). In some embodiments, the hybrid devices 102, 118, and 120 may each be a network device that implements the IEEE Std 1905.1 communication protocols; while the legacy WLAN device 122 may be a network device that does not support the IEEE Std 1905.1 communication protocols. In this embodiment, the hybrid devices 102, 118, and 120 and/or the legacy WLAN device 122 may comprise any suitable number of network interfaces. In some embodiments, the hybrid devices 102, 118, and 120 may each be a network device that implements the total configuration algorithm (TCA) described herein for automatically configuring itself in the communication network. The legacy WLAN device 122 may be a network device that does not implement the TCA described herein.

The hybrid devices 102, 118, and 120 can each be electronic devices configured to implement a plurality of communication protocols or access technologies, such as a laptop computer, a tablet computer, a mobile phone, a smart appliance, a gaming console, an access point, a desktop computer, or other suitable electronic devices. Although not depicted in FIG. 1, the hybrid devices 118 and 120 can each comprise a communication unit, a configuration unit, and a monitoring unit, as depicted with reference to the hybrid device 102. Likewise, the legacy WLAN device 122 can be an electronic device configured to implement a single communication protocol or access technology, such as a laptop computer, a tablet computer, a mobile phone, a smart appliance, a gaming console, an access point, a desktop computer, or other suitable electronic device. In some embodiments, the communication unit of the hybrid devices 102, 118, and 120 and the legacy WLAN device 122 can each be implemented on a system-on-a-chip (SoC), an application specific integrated circuit (ASIC), or another suitable integrated circuit (IC) to enable network communications on their respective network device. In some embodiments, the communication units may each comprise one or more processors and memory, and may each be implemented in one or more integrated circuits on one or more circuit boards of their respective network device. As will further be described below, the configuration unit 106 can execute operations to automatically configure the hybrid device 102; while the monitoring unit 108 can execute operations to monitor the state of the hybrid communication network 100 and determine whether to re-execute the operations to configure the hybrid device 102.

In some embodiments, to enable automatic configuration of the hybrid device 102, the configuration unit 106 can receive the authentication status of each network interface 110, 112, 114, and 116 as an input. The authentication status can indicate, for example, whether the hybrid device 102 (e.g., a PLC module) successfully joined the powerline network (e.g., after push button configuration operations were executed). The configuration unit 106 can also receive channel scan results (e.g., based on executing automatic channel selection (ACS) operations, enhanced ACS (EACS) operations, or another suitable channel scan operations), link metric information (e.g., WLAN received signal strength indicator (RSSI) measurements) from one or more access points (APs) in the hybrid communication network 100, and link quality measurement at least from the local PLC interface 112 to a central access point (also referred to as "CAP," "root access point," "Root AP," or "upstream device"). Additionally, the configuration unit 106 can also receive results of a connectivity test executed for each network interface 110, 112, 114, and 116 to an Internet service provider (ISP) gateway (e.g., ping or dynamic host configuration protocol (DHCP) executed on WLAN, PLC, and Ethernet). In some embodiments, the configuration unit 106 can also receive results of a data rate test between each network interface 110, 112, 114, and 116 of the hybrid device 102 and the CAP.

At stage A, the configuration unit 106 determines whether the hybrid device 102 is a central access point (CAP) of the hybrid communication network 100. The CAP can be an access point that is coupled to the network gateway 124 of the hybrid communication network 100 via a single hop (also referred to as "communication link") over a single communication medium or via a single communication interface. The CAP can be directly coupled to the network gateway 124 or can be coupled to the network gateway 124 via one or more switches. Typically, the CAP can be an access point that is coupled to the network gateway 124 via a single Ethernet communication link. In other embodiments, the CAP can be coupled to the network gateway 124 via another suitable wired communication link (e.g., a PLC communication link, a MoCA communication link, etc.). In other embodiments, the CAP can be coupled to the network gateway 124 via another suitable wireless communication link (e.g., a WiMAX communication link). In some embodiments, the network gateway 124 can be a network device that connects the hybrid communication network 100 (e.g., the home network) to an external network (e.g., that provides Internet access to the home network). Typically, the bridging capability of the CAP can be determined based on a suitable loop avoidance mechanism (e.g., a hybrid spanning tree protocol (hSTP), CAP duplicate detection operations, etc.). For example, if the hybrid communication network 100 is a home network, the CAP can be a home wireless router that directly connects to the network gateway 124. The CAP can serve as the anchor point for constructing WLAN topologies.

At stage B, if the hybrid device 102 is the CAP, the configuration unit 106 determines operating parameters of the CAP. As will be further discussed below in FIGS. 3-4, the configuration unit 106 can determine the operating parameters including an operating communication band (e.g., a 2.4 GHz WLAN communication band, 5 GHz WLAN communication band, etc.) in which the CAP should operate, an operating communication channel of the operating communication band in which the CAP should operate, and a transmit power with which the CAP should transmit messages in the hybrid communication network 100.

At stage C, if the hybrid device 102 is not the CAP, the configuration unit 106 determines whether to switch ON/OFF the WLAN AP and STA modules of the hybrid device 102 and determines operating parameters of the hybrid device 102. Whether to switch ON/OFF the WLAN AP and STA modules of the hybrid device 102 can be referred to as the "personality" of the hybrid device 102. If the hybrid device 102 is not the CAP of the hybrid communication network 100, the hybrid device 102 may also be referred to herein as a "non-CAP" hybrid device. If the hybrid device 102 is not the CAP of the hybrid communication network 100, the configuration unit 106 can operate in conjunction with the CAP to determine the personality and the operating parameters of the non-CAP hybrid device 102. The configuration unit 106 can analyze the received inputs (e.g., the authentication status, channel scan results, link metric information, link quality measurements, etc.). For the WLAN interfaces of the hybrid device 102, the configuration unit 106 can indicate whether a WLAN AP module (e.g., a WLAN module configured as an access point) and/or a WLAN STA module (e.g., a WLAN module configured as a client station) should be enabled or disabled (e.g., switched ON/OFF), a band/channel in which the WLAN module of the hybrid device 102 should operate, a transmit power at which the WLAN AP module should operate, whether RTS/CTS protocol should be used for collision avoidance, and other such operating information. The configuration unit 106 can also indicate the flooding behavior of bridging-capable network interfaces of the hybrid device 102. In some embodiments, in addition to configuring the WLAN interfaces 114 and 116 of hybrid device 102, the configuration unit 106 can determine and indicate configuration parameters associated with the PLC interface 112 and/or other network interfaces (e.g., Ethernet, MoCA, EOC, etc.) of the hybrid device 102. In addition, the configuration unit 106 can determine the operating parameters of the non-CAP hybrid device (e.g., an operating communication band, an operating communication channel, a transmit power, etc.) based, at least in part, on the operating parameters of the CAP and the personality of the non-CAP hybrid device. Operations for determining the personality, band, channel, and the power of the non-CAP hybrid device will further be described with reference to FIG. 5.

At stage D, the monitoring unit 108 monitors the hybrid communication network 100 and determines whether to re-evaluate the configuration of the hybrid device 102. The monitoring unit 108 can monitor the status of the hybrid communication network 100 and can determine, for example, whether network interfaces have been disabled, whether hybrid devices have been added to the hybrid communication network 100, whether the quality of communication links has deteriorated, etc. Based on the status of the hybrid communication network 100, the monitoring unit 108 can determine whether the configuration of the hybrid device 102 should be re-evaluated (e.g., whether the operations described above with reference to stages A-C should be re-executed). For example, the configuration of the hybrid device 102 may be re-evaluated if a network device (e.g., a hybrid device or a legacy device) is added to the hybrid communication network 100, if a network interface (e.g., a WLAN STA) of the hybrid device fails, etc. If so, the monitoring unit 108 can notify the configuration unit 106 to re-evaluate the configuration of the hybrid device 102.

In some embodiments, for automatic configuration of the hybrid device 102, the configuration unit 106 may make various assumptions about the hybrid communication network 100, as will be further described in the Figures below. For example, it may be assumed that the network gateway 124 of the hybrid communication network 100 is connected to the CAP. If the hybrid device designated as the CAP comprises a WLAN STA module (e.g., a WLAN module configured as a client station), then the WLAN STA module of the CAP may be disabled. The hybrid device designated as the CAP may also be designated as an IEEE Std 1905.1 registrar of the hybrid communication network 100. As another example, it may be assumed that the hybrid communication network 100 only comprises one CAP. As another example, it may be assumed that all the WLAN client stations on the TCA-capable hybrid devices (e.g., the hybrid devices that execute functionality for automatic configuration described herein) are connected to a CAP or a non-CAP access point. In some embodiments, if the WLAN AP module of the hybrid device is enabled (e.g., switched ON) then the WLAN STA module of the hybrid device can associate with the CAP. In some embodiments, if the WLAN AP module of the hybrid device is disabled (e.g., switched OFF), then the WLAN STA module of the hybrid device may associate with either the CAP or any non-CAP access point of the hybrid communication network 100. In some embodiments, other network devices in the hybrid communication network 100 that are not TCA-capable may connect to any access point in the hybrid communication network.

In some embodiments, one or more of the hybrid devices (e.g., whether or not they are bridging-capable hybrid devices) in the hybrid communication network 100 may be configured to execute the operations for automatic configuration described herein. In some embodiments, the hybrid communication network 100 that comprises TCA-capable hybrid devices may also be compatible with legacy WLAN devices (e.g., WLAN only devices that do not operate in accordance with IEEE Std 1905.1) and/or legacy PLC devices (e.g., PLC-only devices that do not operate in accordance with IEEE Std 1905.1).

It is further noted that the hybrid communication network 100 can comprise any suitable number of hybrid devices, any suitable number of legacy devices, and each of these network devices can be inter-connected in any suitable format. In some embodiments, all the network devices in the hybrid communication network can be hybrid devices (e.g., IEEE Std 1905.1 compatible devices). In other embodiments, one or more IEEE Std 1905.1 hybrid routers can be used to provide coverage in a hybrid communication network. However, one or more legacy WLAN access points can also be used in the hybrid communication network to assist with better coverage. In this embodiment, a user may manually configure the WLAN credentials (e.g., SSID and WLAN passphrase) for the hybrid router to match the WLAN credentials of the legacy WLAN access point to avoid reconfiguring all existing end WLAN devices.

Figure 2:
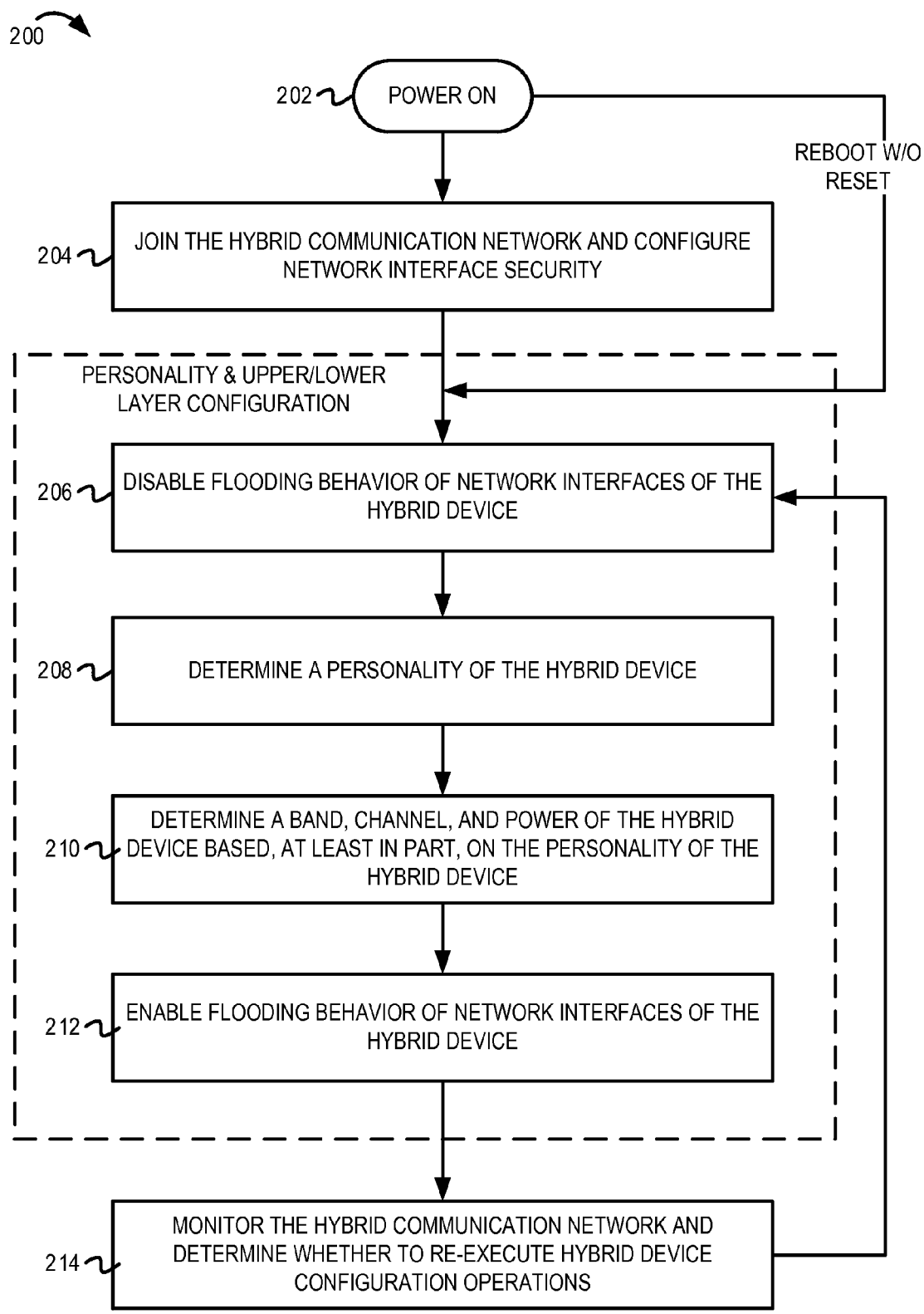
FIG. 2 is a flow diagram illustrating example operations for automatic configuration of a hybrid device in a hybrid communication network.

FIG. 2 is a flow diagram ("flow") 200 illustrating example operations for automatic configuration of a hybrid device in a hybrid communication network. The flow 200 begins at block 202.

At block 202, the hybrid device executes one or more power-up operations. In some embodiments, the personality of the hybrid device (e.g., the hybrid device 102 of FIG. 1) may not be preserved across power ON/OFF cycle. Therefore, when the hybrid device 102 is powered on, the hybrid device 102 can execute one or more personality identification operations that will be described in further detail below in FIGS. 2-5. The flow continues at block 204. In some embodiments, e.g., if a reboot without reset is performed, then the flow continues at block 206 because security credentials of the PLC and WLAN modules may be stored in non-volatile memory and may be maintained across power cycles.

At block 204, the hybrid device joins the hybrid communication network and configures network interface security. For example, WLAN interface security may be configured based on user input, push button Wi-Fi® simple connect (WSC) operations, randomization, IEEE Std 1905.1 autoconfig operations, or other suitable WLAN security configuration operations that may or may not rely on the push button connection (PBC) procedures. As another example, the PLC interface security may be configured based on user input, push button simple connect operations, or other suitable PLC security configuration operations. The flow continues at block 206.

At block 206, flooding behavior of network interfaces of the hybrid device is disabled. The flooding behavior is part of the bridging behavior of the hybrid device 102. In general, the bridging behavior can indicate how a unicast packet should be routed through the hybrid communication network 100. Disabling the flooding behavior of the hybrid device 102 can serve to prevent bridging loops (in the hybrid communication network 100) which can be catastrophic and cause failure of the hybrid communication network 100. In disabling the flooding behavior, broadcast and multicast packets may not be bridged across network interfaces of the hybrid device 102, while the hybrid device 102 is in the configuration state. As will be further discussed below, as part of the configuration process, the personality of the hybrid device 102 can be determined. In addition, it can also be determined whether each network interface of the hybrid device can support bridging. After the flooding behavior is disabled, the flow continues at block 208, where the personality of the hybrid device is determined.

At block 208, a personality of the hybrid device is determined. Each hybrid device 102 can be assigned one of the following personalities. The hybrid device 102 can be 1) a central access point (CAP) of the hybrid communication network 100, 2) a standby CAP that is not the CAP but it is capable of being the CAP if the existing CAP fails or disappears from the network 100, 3) a non-CAP device that is neither a CAP nor a standby CAP, or 4) an unknown personality type. The non-CAP device can be assigned a personality per communication band on which the non-CAP device (e.g., the WLAN module) is configured to operate. The personality of the non-CAP hybrid device may also be referred to herein as "second-level personality." As will further be discussed below in FIG. 5, the non-CAP hybrid device can be: 1) an access point (e.g., a WLAN AP module of the hybrid device is enabled and a WLAN STA module of the hybrid device is disabled), 2) a relay (e.g., the WLAN AP module and the WLAN STA module of the hybrid device are enabled and are operating on the same communication channel/band), 3) a sink (e.g., the WLAN AP module of the hybrid device is disabled and the WLAN STA module of the hybrid device is enabled), or 4) disabled (e.g., the WLAN AP module and the WLAN STA module of the hybrid device are disabled). In some embodiments, if the hybrid device 102 does not have any previously stored personality, the hybrid device 102 is assigned an "unknown" type. After personality identification operations are executed, the type of the device (e.g., whether an access point, a relay, a sink, or disabled) can be determined and stored across power cycles.

After the personality identification operations are executed (described further in FIG. 3), if it is determined that the hybrid device 102 is the CAP, the hybrid device 102 can automatically determine its WLAN credentials (e.g., the CAP can select an SSID, generate a random WLAN passphrase, etc.). In addition, the CAP can also operate in conjunction with other hybrid devices 118 and 120 to determine the second-level personality of the other hybrid devices. In some embodiments (e.g., if the hybrid communication network 100 comprises a legacy WLAN access point), the user may override operations for selecting the SSID and WLAN passphrase. In this embodiment, a user may manually configure the WLAN credentials (e.g., SSID and WLAN passphrase) for the CAP to match the WLAN credentials of the legacy WLAN access point. Alternately, the CAP can determine the WLAN credentials of the legacy WLAN access point (e.g., using Wi-Fi protected setup (WPS) operations), configure itself using the WLAN credentials of the legacy WLAN access point, and distribute the WLAN credentials of the legacy WLAN access point to other hybrid devices in the communication network 100. In some embodiments, the communication network 100 may include multiple legacy WLAN access points. In this embodiment, each of the legacy WLAN access points that operate on the same WLAN communication band (e.g., 2.4 GHz WLAN band, 5 GHz WLAN band, etc.) may have the same WLAN credentials. For example, the CAP may configure its WLAN credentials for the 2.4 GHz WLAN band using the common WLAN credentials of the legacy WLAN access points operating on the 2.4 GHz WLAN band. The CAP may configure its WLAN credentials for the 5 GHz WLAN band using the common WLAN credentials of the legacy WLAN access points operating on the 5 GHz WLAN band. In some embodiments, after the hybrid device obtains/determines its WLAN credentials, these WLAN credentials may be stored and maintained across power cycles. In some embodiments, the IP address and/or the MAC address of the hybrid device may be registered with the network gateway 124 of the hybrid communication network 100. Operations for determining the personality (and second-level personality) of the hybrid device 102 will further be described with reference to FIGS. 3-5. After the personality of the hybrid device is determined, the flow continues at block 210.

At block 210, the band, channel, and power are determined for the hybrid device. For example, the configuration unit 106 can determine the operating communication band (e.g., 2.4 GHz WLAN band, 5 GHz WLAN band, etc.), operating communication channel of the operating communication band, and transmit power for WLAN transmissions. The configuration unit 106 may determine the operating communication band, the operating communication channel, and the transmission power depending on whether the hybrid device is the CAP and (if not the CAP) depending on whether the non-CAP hybrid device is configured as an access point, a relay, a sink, or is disabled. The flow continues at block 212.

At block 212, flooding behavior of the hybrid device is enabled. For example, if it is determined that the network interfaces of the hybrid device can support the bridging operations without causing loops in the hybrid communication network, then the flooding behavior of the hybrid device can be enabled. In some embodiments, whether to enable flooding behavior for one or more network interfaces of the hybrid device 102 can depend on the personality of the hybrid device 102. For example, if the hybrid device 102 is the CAP, all the bridging capability can be enabled for all the network interfaces of the hybrid device 102. As another example, if the hybrid device 102 is a standby CAP, bridging functionality between the network interfaces through which the CAP is reachable can be disabled. In this example, the bridging functionality between the Ethernet interface (connected to the network gateway 124) and the PLC interface of the standby CAP can be disabled. As another example, if the hybrid device 102 is a non-CAP device, bridging functionality between the hybrid device 102 and "downstream" network interfaces (e.g., away from the CAP) can be enabled; while bridging functionality between the hybrid device 102 and "upstream" network interfaces (towards the CAP) may be disabled. The non-CAP device may also enable bridging between the upstream network interfaces and the downstream network interfaces. The flow continues at block 214.

At block 214, the hybrid communication network is monitored to determine whether to re-execute hybrid device configuration operations. The monitoring unit 108 can perform event-based or time-based monitoring operations. For example, the monitoring operations may be executed at periodic intervals and/or in response to detecting that a network interface of any hybrid device in the hybrid communication network has been enabled/disabled. The monitoring unit 108 may also analyze channel performance, RSSI of signals received from access points in the hybrid communication network, DHCP, traffic load, and/or other suitable performance measurements to determine whether the hybrid device configuration operations should be re-executed. As depicted in FIG. 2, if the monitoring unit 108 determines that the hybrid device configuration operations should be re-executed, the monitoring unit 108 notifies the configuration unit 106 to re-evaluate the personality of the hybrid device and the flow loops back to block 206.

Figure 3:
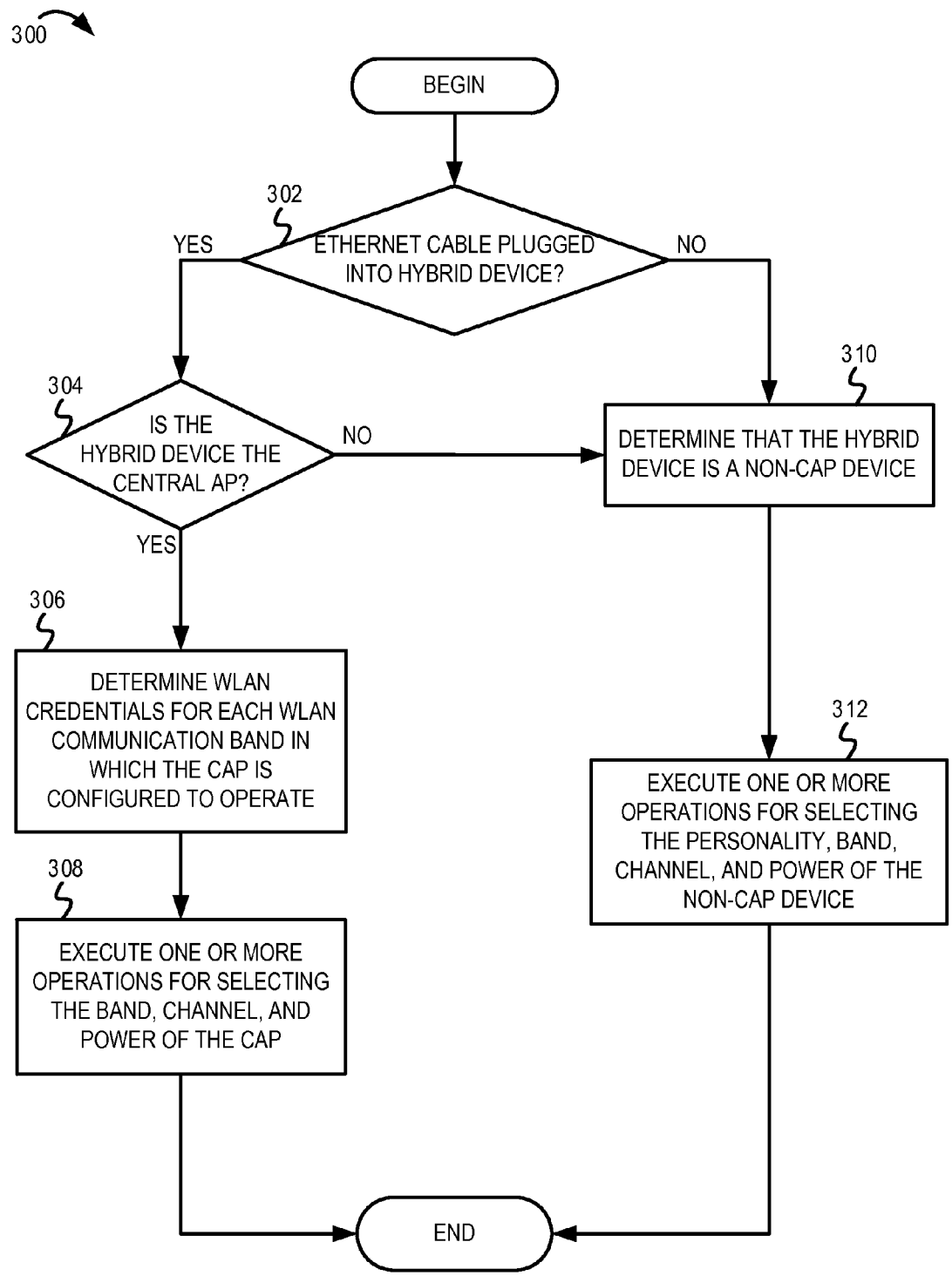
FIG. 3 is a flow diagram for determining a personality of the hybrid device.

FIG. 3 is a flow diagram 300 for determining a personality of the hybrid device. The flow 300 begins at block 302.

At block 302, it is determined whether an Ethernet cable is physically connected to a hybrid device. With reference to the example of FIG. 1, the configuration unit 106 can determine whether an Ethernet device is connected to the Ethernet interface 110 of the hybrid device 102. If it is determined that the Ethernet cable is plugged into the hybrid device 102, then the hybrid device 102 may be further analyzed to determine whether to designate the hybrid device as the CAP of the hybrid communication network. In FIG. 3, if it is determined that the Ethernet cable is plugged into the hybrid device 102, the flow continues at block 304. Otherwise, it is determined that the hybrid device should not be designated as the CAP of the hybrid communication network and the flow continues at block 310.

At block 304, it is determined whether the hybrid device is a CAP of the hybrid communication network. In one example, the configuration unit 106 of the hybrid device 102 can determine whether the hybrid device 102 should be designated as the CAP of the hybrid communication network 100. In some embodiments, the configuration unit 106 can determine whether a wide area network (WAN) is reachable from a wired network interface of the hybrid device 102 to determine whether the hybrid device 102 is the CAP of the hybrid communication network 100. For example, the configuration unit 106 can determine whether a WAN is reachable from a dedicated and reliable wired networking technology, such as Ethernet. If a WAN is not reachable from the wired network interface of the hybrid device 102, then the hybrid device 102 can be designated as a "non-CAP" device. If a WAN is reachable from the wired network interface of the hybrid device 102, then the hybrid device 102 can be designated as the CAP or a standby CAP. In some embodiments, to determine whether the hybrid device 102 is the CAP of the hybrid communication network 100, the hybrid device 102 can execute DHCP detection operations. For example, the configuration unit 106 can determine whether the hybrid communication network comprises a DHCP server. In some embodiments, the hybrid device 102 can transmit a DHCP discover message at periodic intervals for a predetermined time interval. After transmitting the DHCP discover message, the hybrid device 102 can wait to receive a corresponding DHCP offer message in response to the transmitted discover message. If the hybrid device 102 receives the DHCP offer message within a predetermined time interval, it is determined that the DHCP server is present. If the hybrid device 102 does not receive the DHCP offer message in response to any of the transmitted discover messages, it is determined that the hybrid communication network does not comprise a DHCP server that is reachable from the Ethernet interface 110 of the hybrid device 102. If a DHCP server that is reachable from the Ethernet interface 110 of the hybrid device 102 cannot be identified, then the hybrid device 102 can be designated as a "non-CAP" device. If a DHCP server that is reachable from the Ethernet interface 110 of the hybrid device 102 is identified, the hybrid device 102 can be designated as the CAP or a standby CAP.

In some embodiments, the CAP may always be directly connected to (e.g., one hop or one communication link away from) the network gateway 124 of the hybrid communication network. A standby CAP may also be directly connected to (e.g., one hop or one communication link away from) the network gateway 124. In some embodiments, the hybrid device 102 may be designated as the CAP or the standby CAP if the hybrid device 102 is communicatively coupled with the network gateway 124 of the hybrid communication network 100 via a single communication interface (e.g., the Ethernet communication interface). The standby CAP can become the CAP of the hybrid communication network if the current CAP is disabled or if the current CAP fails. Whether the hybrid device 102 is designated as a CAP or a standby CAP may depend on the communication capabilities of the hybrid device 102, the performance measurements of the hybrid device 102 with respect to other network devices in the hybrid communication network, and so on. If it is determined that the hybrid device 102 is the CAP, the flow continues at block 306. Otherwise, it is determined that the hybrid device 102 should be designated as a "non-CAP" device and the flow continues at block 310.

At block 306, WLAN credentials are determined for each WLAN communication band in which the CAP is configured to operate. In some embodiments, the WLAN credentials may be configured for the 2.4 GHz WLAN communication band and the 5 GHz WLAN communication band irrespective of whether the CAP is configured to operate only in a single communication band. In some embodiments, a CAP mode may also be determined. For example, the CAP may be configured so that the WLAN AP module of the hybrid device 102 is switched ON and the WLAN STA module of the hybrid device 102 is switched OFF (e.g., the WLAN STA module need not be switched ON because the hybrid device 102 is directly connected to the network gateway 124 via the Ethernet interface 110). In some embodiments, the CAP can also be an AP registrar of the hybrid communication network (e.g., an IEEE Std 1905.1 AP registrar). The flow continues at block 308.

At block 308, one or more operations for selecting the band, channel, and power of the CAP ("CAP BCP selection operations") are executed. For example, the configuration unit 106 can execute the CAP BCP selection operations to select the communication band and channel on which the CAP will operate and to determine the transmission power of the CAP. The CAP BCP selection operations will further be described with reference to FIG. 4. From block 308, the flow ends.

At block 310, it is determined that the hybrid device is a non-CAP device. The flow 300 moves from block 302 to block 310 and the hybrid device 102 is identified as a non-CAP device, if it is determined that the Ethernet cable is not connected to the Ethernet interface 110 of the hybrid device 102. The flow 300 moves from block 304 to block 310 and the hybrid device 102 is identified as a non-CAP device if the hybrid device is not directly connected to the network gateway 124 of the hybrid communication network (e.g., if the hybrid device is two or more communication hops away from the network gateway 124) and if a wide area network is not reachable from a wired interface of the hybrid device 102. After the hybrid device is designated as a non-CAP device, the flow continues at block 312.

At block 312, one or more operations for selecting the personality, band, channel, and power of the non-CAP device ("non-CAP PBCP selection operations") are executed. In some embodiments, if it is determined that the hybrid device 102 is not the CAP, the hybrid device 102 can wait for a user to push a button associated with the non-CAP hybrid device 102 (e.g., for push button configuration (PBC) procedures). If the user pushes the button on the hybrid device 102 and the button on the CAP, the WLAN STA module of the hybrid device 102 can execute WLAN PBC operations and PLC PBC operations with the CAP to establish the WLAN communication link and the PLC communication link respectively. In some embodiments, if the WLAN STA module (e.g., of the non-CAP hybrid device 102) is unable to determine the WLAN credentials of the CAP using the WLAN communication link, the WLAN STA module can obtain the WLAN credentials from the CAP via the PLC communication link once the PLC communication link is established. In some embodiments, if the user pushes the button of the non-CAP hybrid device 102 and the button of another in-network hybrid device before the CAP is configured, a PLC communication link may be established between the two hybrid devices but the WLAN communication link may not be established. In this embodiment, after the CAP is configured, the WLAN communication link can be established (i.e., between the hybrid device 102 and the CAP) and the WLAN credentials can be transferred (from the CAP) to the two hybrid devices. After the CAP is configured and becomes a part of the hybrid communication network, communication link quality measurements between the non-CAP hybrid device 102 and the CAP can be determined and the personality of the non-CAP hybrid device 102 can be determined based on the communication link quality measurements. The non-CAP hybrid device 102 can be configured for optimal performance of the hybrid device 102 and the hybrid communication network 100. As will be further described below, the non-CAP devices can be assigned a second-level personality, such as: 1) an access point (e.g., when the AP of the hybrid device is switched ON and the STA of the hybrid device is switched OFF), 2) a relay (e.g., when both the AP and STA are switched ON), 3) a sink (e.g., when the STA is switched ON and the AP is switched OFF), or 4) disabled (e.g., when both STA and AP are switched OFF). From block 312, the flow ends.

Figure 4:
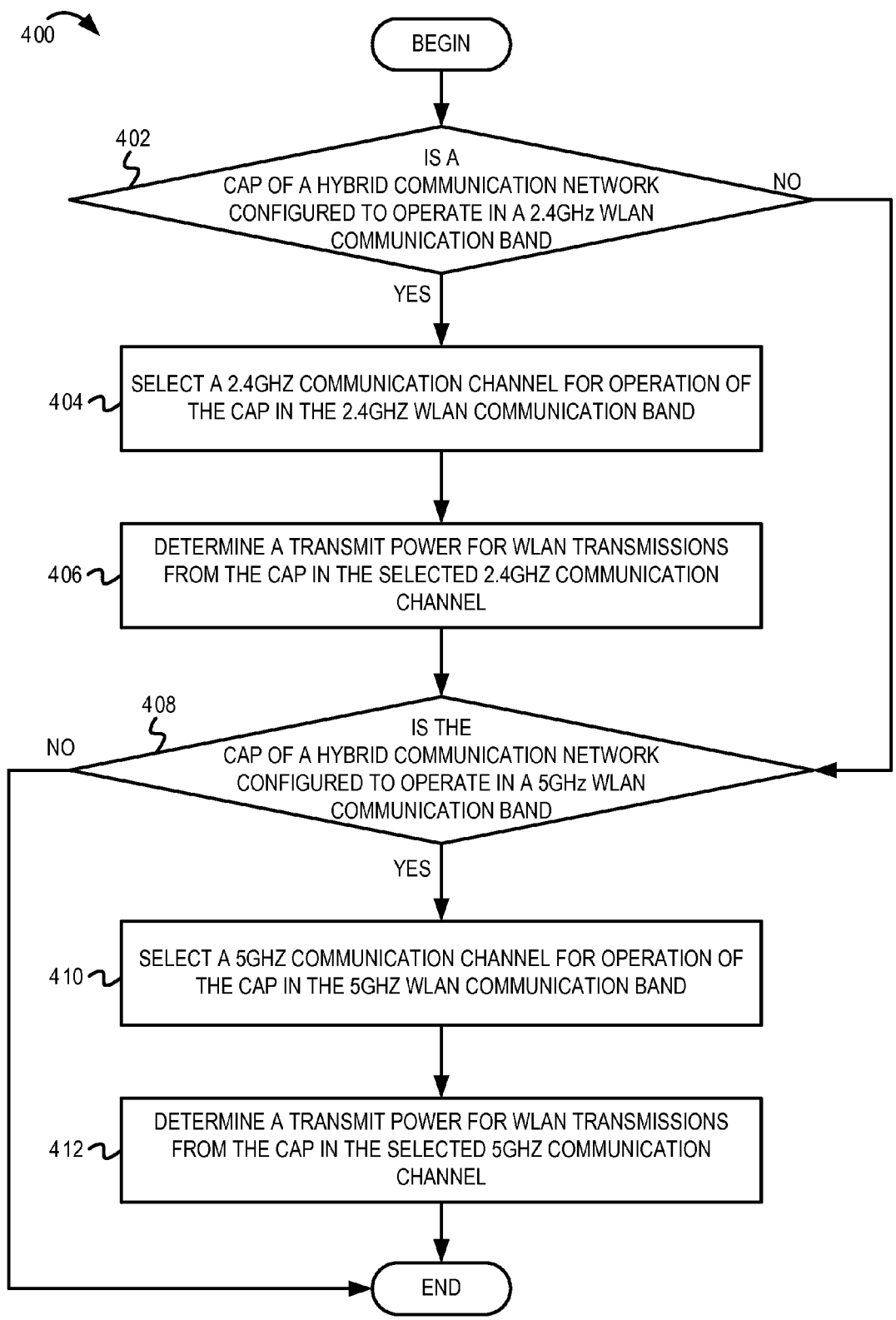
FIG. 4 is a flow diagram illustrating example operations for selecting the band, channel, and power of the central access point (CAP)

FIG. 4 is a flow diagram 400 illustrating example operations for selecting the band, channel, and power of the central access point (CAP BCP selection). The flow 400 begins at block 402.

At block 402, it is determined whether the CAP of the hybrid communication network is configured to operate in a 2.4 GHz WLAN communication band. If it is determined that the CAP is configured to operate in the 2.4 GHz WLAN communication band, the flow continues at block 404. Otherwise, the flow continues at block 408.

At block 404, a 2.4 GHz communication channel is selected for operation of the CAP in the 2.4 GHz WLAN communication band. For example, the CAP can execute EACS operations, ACS operations, or other suitable channel scan operations to identify and select a communication channel with a preferred performance in the 2.4 GHz WLAN communication band. For example, the CAP can select a communication channel that does not comprise other active access points. As another example, the CAP can select a communication channel that comprises active access points associated with a low RSSI. The CAP can be configured to operate on the preferred communication channel in the 2.4 GHz WLAN communication band. The flow continues at block 406.

At block 406, a transmit power is selected for WLAN transmission from the CAP in the selected 2.4 GHz communication channel. In some embodiments, the selected transmit power may be the maximum transmit power of the CAP. In other embodiments, the transmit power may be selected based, at least in part, on the topology of the hybrid communication network, the interference, and other such considerations. In some embodiments, after the transmit power is selected, the transmit power may be dynamically adapted based on the distance from the receiving device and the changing conditions of the hybrid communication network. The flow continues at block 408.

At block 408, it is determined whether the CAP of the hybrid communication network is configured to operate in a 5 GHz WLAN communication band. If it is determined that the CAP is configured to operate in the 5 GHz WLAN communication band, the flow continues at block 410. Otherwise, the flow ends.

At block 410, a 5 GHz communication channel is selected for WLAN operation of the CAP in the 5 GHz WLAN communication band. For example, the CAP can execute the EACS operations, the ACS operations, or other suitable channel scan operations to identify and select a communication channel with the preferred performance in the 5 GHz WLAN communication band. For example, the CAP can select a communication channel that does not comprise other active access points. As another example, the CAP can select a communication channel that comprises active access points associated with a low RSSI. This CAP can be configured to operate on the preferred communication channel in the 5 GHz WLAN communication band. The flow continues at block 412.

At block 412, a transmit power is selected for WLAN transmission from the CAP in the selected 5 GHz communication channel. In some embodiments, the selected transmit power may be the maximum transmit power of the CAP. In other embodiments, the transmit power may be selected based, at least in part, on the topology of the hybrid communication network, the interference, and other such considerations. In some embodiments, after the transmit power is selected, the transmit power may be dynamically adapted based on the distance from the receiving device and the changing conditions of the hybrid communication network. From block 412, the flow ends.

In some embodiments, if the CAP is capable of 40 MHz operation (e.g., if the width of each channel in the WLAN communication band is 40 MHz), the CAP can execute the following operations when trying to select the operating channel(s). The CAP can transmit a message to cause all the access points in the hybrid communication network to be switched off. The CAP can then try to select the preferred 40 MHz channel in the operating communication band (e.g., the 2.4 GHz WLAN communication band or the 5 GHz WLAN communication band). If the CAP determines that it is not possible to operate in 40 MHz because of conflicting channels that are being used by APs in neighboring networks, the CAP may switch to 20 MHz operation (e.g., where the width of each channel in the WLAN communication band is 20 MHz). After the CAP selects one or more channels, the CAP can broadcast a message to indicate that it is in operation and to indicate the channel(s) it has selected.

Although examples describe operations for selecting a 20 MHz WLAN operating channel or a 40 MHz WLAN operating channel, embodiments are not so limited. In other embodiments, the CAP (or another suitable network device) may select an operating channel with any suitable bandwidth based on the communication protocol being implemented. For example, if the CAP implements an IEEE 802.11ac WLAN communication protocol, the CAP may be configured to select an 80 MHz WLAN operating channel or a 160 MHz WLAN operating channel.

Figure 5:
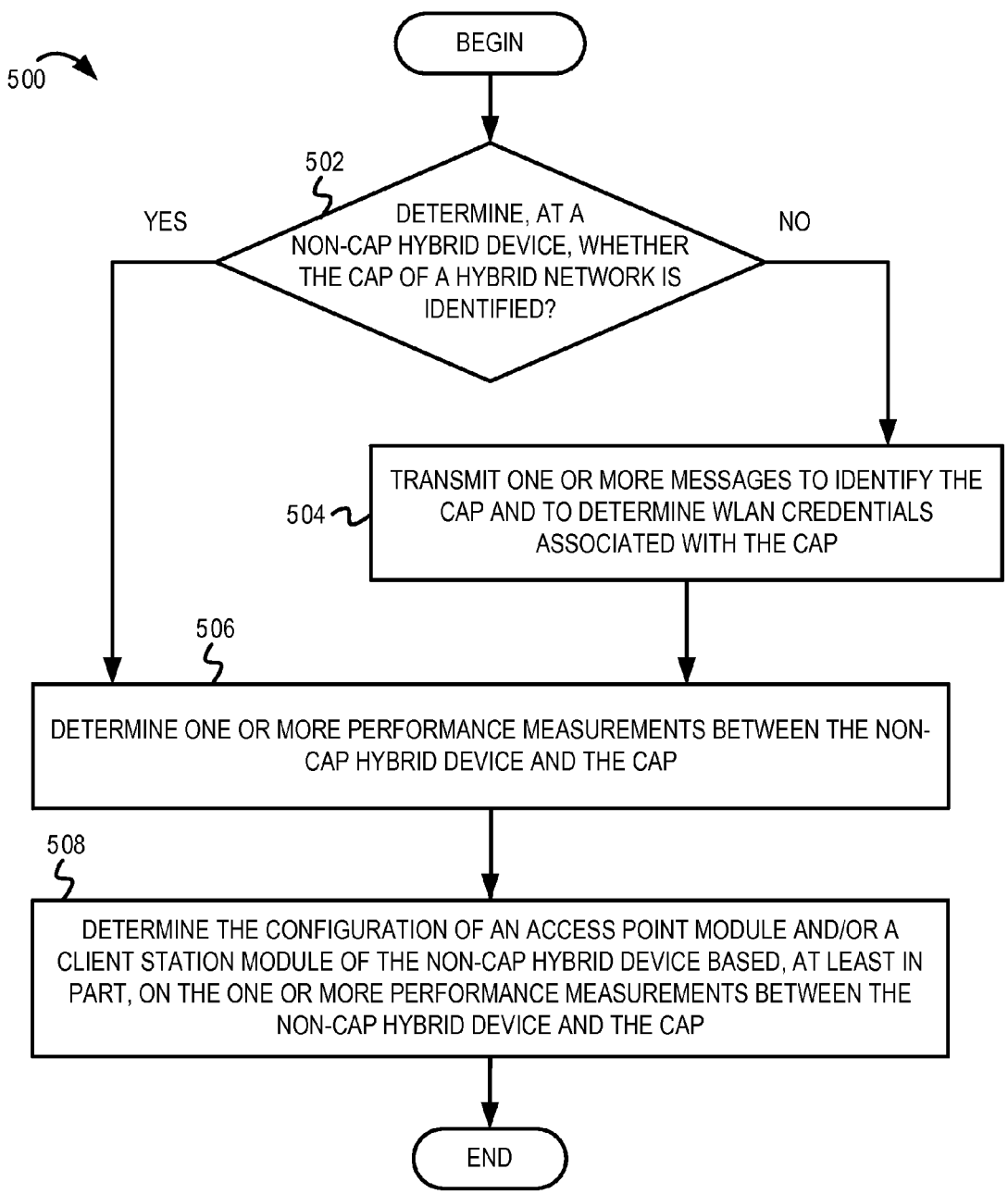
FIG. 5 is a flow diagram illustrating example operations for selecting the personality, band, channel, and power of the non-central access point device (non-CAP device)

FIG. 5 is a flow diagram 500 illustrating example operations for selecting the personality, band, channel, and power of the non-central access point device (non-CAP PBCP selection). The flow 500 begins at block 502.

At block 502, a non-CAP hybrid device determines whether a CAP of the hybrid communication network can be identified. For example, the configuration unit 106 of the hybrid device 102 can determine whether a message indicating that the CAP is configured and available in the hybrid communication network was received from the CAP. If the CAP cannot be identified, the flow continues at block 504. Otherwise, if the non-CAP hybrid device (e.g., the configuration unit 106) has obtained the WLAN credentials associated with the CAP and a confirmation message indicating that the CAP is in operation, the non-CAP hybrid device can wait for a random time period before executing the non-CAP PBCP selection operations described herein. In other words, if the CAP was previously identified, the flow continues at block 506.

At block 504, one or more messages are broadcast to identify the CAP and to determine WLAN credentials associated with the CAP. After the CAP is identified and the WLAN credentials associated with the CAP are received, the configuration unit 106 can wait for the random time period before executing the non-CAP PBCP selection operations described herein. The flow continues at block 506.

At block 506, one or more performance measurements between the non-CAP hybrid device and the CAP are determined. For example, the non-CAP hybrid device can determine one of more of: 1) WLAN connection quality to the CAP on all the communication bands, 2) PLC connection quality to the CAP, 3) WLAN coverage, 4) candidate channels selected by channel scan operations on all WLAN communication bands, and 5) a number of communication hops (or communication links) between the non-CAP hybrid device and the CAP.

In some embodiments, the WLAN connection quality to the CAP can be a signal strength (e.g., RSSI) of a WLAN signal received (at a WLAN interface of the non-CAP hybrid device) from the CAP on all the communication bands on which the CAP is configured to operate (e.g., 2.4 GHz WLAN communication band, 5 GHz WLAN communication band, etc.). Specifically, the WLAN connection quality can be representative of the quality of a connection (i.e., communication link) between a WLAN STA module of the non-CAP hybrid device and the CAP. The WLAN connection quality can be deemed "inadequate" if the WLAN connection does not exist or is of a poor quality. The WLAN connection quality can be deemed "adequate" if the WLAN connection is of a good quality. In some embodiments, if the RSSI of the signal received from the CAP is greater than a predetermined RSSI threshold (e.g., an RSSI_moderate_threshold further described below), the WLAN connection quality is deemed adequate. Otherwise, if the RSSI of the signal received from the CAP is less than the predetermined RSSI threshold (e.g., the RSSI_moderate_threshold) the WLAN connection quality is deemed inadequate. In other embodiments, the configuration unit 106 can execute a short data rate test to check the data rate supported between the CAP and the non-CAP hybrid device via the WLAN connection. The configuration unit 106 can determine the WLAN connection quality based, at least in part, on the data rate supported.

The PLC connection quality can be representative of the quality of the data connection (i.e., communication link) between the hybrid device's PLC module and the CAP. The PLC connection quality can be deemed "inadequate" if the PLC connection does not exist or is of a poor quality. The PLC connection quality can be deemed "adequate" if the PLC connection is of a good quality. In some embodiments, the PLC connection quality to the CAP can be indicative of the signal strength of a PLC signal received from the CAP at a PLC interface of the non-CAP hybrid device. In some embodiments, the non-CAP hybrid device (e.g., the configuration unit 106) can query the PLC module of the non-CAP hybrid device for the PLC connection quality (e.g., signal strength) between the non-CAP hybrid device and the CAP. If the PLC connection quality is greater than a predetermined quality (e.g., a PLC_adequate_threshold further described below), the PLC connection quality is deemed adequate. Otherwise, if the PLC connection quality is less than the predetermined quality (e.g., the PLC_adequate_threshold), the PLC connection quality is deemed inadequate. In other embodiments, configuration unit 106 can execute a short data rate test to check the data rate supported between the CAP and the hybrid device via the PLC connection. The configuration unit 106 can determine the PLC connection quality based, at least in part, on the data rate supported.

The 2.4 GHz WLAN coverage can be the maximum value of all the RSSI values measured between the non-CAP hybrid device and any access point (including the CAP) in the hybrid communication network 100. In general, the WLAN connection quality (discussed above) can refer to the quality of the communication link between the non-CAP hybrid device and the CAP. The 2.4 GHz WLAN coverage is determined based on analyzing the quality (e.g., RSSI) of the communication link between the non-CAP hybrid device and each access point in the hybrid communication network. The non-CAP hybrid device may determine its connectivity to the CAP because the non-CAP hybrid device typically transmits most of its communications to the CAP. However, by determining its connectivity to the other access points in the hybrid communication network (e.g., by determining the 2.4 GHz WLAN coverage), the non-CAP hybrid device can determine whether its transmissions will cause interference in the hybrid communication network. For example, if there are two non-CAP hybrid devices in close proximity to each other and one of the non-CAP hybrid devices is configured as an access point, then the other non-CAP hybrid device may not be configured as an access point to reduce interference.

In one example, the 2.4 GHz WLAN coverage can be the maximum value of all the RSSI values measured between the non-CAP hybrid device and any access point that has its SSID set to a predetermined SSID (e.g., "SSID1", in one example) on any channel in the 2.4 GHz WLAN communication band. In this example, SSID1 can represent the SSID configured on the IEEE Std 1905.1 registrar for the 2.4 GHz WLAN communication band. The 2.4 GHz WLAN coverage can be used to estimate the WLAN coverage of the 2.4 GHz WLAN communication band at the location of the non-CAP hybrid device. The 2.4 GHz WLAN coverage can be deemed "weak" if the maximum RSSI value is less than a first RSSI threshold (e.g., signal<RSSI_moderate_threshold). If the 2.4 GHz WLAN coverage is weak then the non-CAP hybrid device may not be configured as a relay in the hybrid communication network. The 2.4 GHz WLAN coverage can be deemed "moderate" if the maximum RSSI value falls within the first RSSI threshold and a second RSSI threshold (e.g., RSSI_moderate_threshold≤signal<RSSI_good_threshold). If the 2.4 GHz WLAN coverage is moderate, the non-CAP hybrid device may potentially be configured as a relay of the hybrid communication network. The 2.4 GHz WLAN coverage can be deemed "good" if the maximum RSSI value is greater than the second WLAN threshold (e.g., RSSI_good_threshold≤signal). If the 2.4 GHz WLAN coverage is good, the non-CAP hybrid device may not be configured as a relay of the hybrid communication network because of potential interference issues. However, the non-CAP hybrid device may still become a relay on the CAP's channel if the preferred channel for SSID1 is the same as the CAP's channel. It is noted that the RSSI_moderate_threshold can be the WLAN RSSI threshold above which the quality of the communication link is considered "moderate." The RSSI_good_threshold can be greater than or equal to the RSSI_moderate_threshold and can be the RSSI threshold above which the communication link is considered "good." The WLAN RSSI thresholds can be any suitable value and may be determined based on the number and type of devices in the hybrid communication network, the network topology, the traffic, and other suitable factors.

Operations for determining the 5 GHz WLAN coverage of the hybrid device can be executed as similarly discussed above with reference to the 2.4 GHz WLAN coverage. To determine the 5 GHz WLAN coverage, the non-CAP hybrid device (e.g., the configuration unit 106) can determine the RSSI measurements in the 5 GHz WLAN communication band between the non-CAP hybrid device and each access point operating in the 5 GHz WLAN communication band. In some embodiments, the RSSI measurements for the 2.4 GHz WLAN communication band and the 5 GHz WLAN communication band may be the same. In other embodiments, however, the RSSI measurements for the 2.4 GHz WLAN communication band may be different from the RSSI measurements for the 5 GHz WLAN communication band because of different propagation characteristics.

In some embodiments, the RSSI measurements for the 2.4 GHz WLAN communication band can be determined and averaged over a predetermined time interval. Likewise, the RSSI measurements for the 5 GHz WLAN communication band can be determined and averaged over a predetermined time interval. In some embodiments, the time interval for determining the RSSI measurements for the 2.4 GHz WLAN communication band may be different from the time interval for determining the RSSI measurements for the 5 GHz WLAN communication band. In other embodiments, the RSSI measurements for the 2.4 GHz WLAN communication band and the RSSI measurements for the 5 GHz WLAN communication band may be determined during the same time interval. In addition, the non-CAP hybrid device can also execute channel scan operations to select candidate channels (e.g., channels with the preferred performance) on each WLAN communication bands. The non-CAP hybrid device can also determine a number of communication hops (or communication links) between the non-CAP hybrid device and the CAP. After the performance measurements between the non-CAP hybrid device and the CAP are determined, the flow continues at block 508.

At block 508, the configuration of the AP module of the non-CAP hybrid device and the STA module of the non-CAP hybrid device are determined based, at least in part, on the one or more performance measurements between the non-CAP hybrid device and the CAP. The configuration of the WLAN AP module and the WLAN STA module of the non-CAP hybrid device can indicate whether the WLAN AP module is switched ON/OFF and whether the WLAN STA module is switched ON/OFF. The configuration of the WLAN AP module and the WLAN STA module of the non-CAP hybrid device may also be referred to as the personality of the non-CAP hybrid device. In some embodiments, in addition to the candidate channels, the channel on which the CAP currently operates may also be taken into consideration while determining the personality of the non-CAP hybrid device. For example, the configuration unit 106 can identify a preferred channel (e.g., a channel with the best performance, such as a highest RSSI, lowest error rate, etc.) from the candidate channels, compare the preferred channel with the channel on which the CAP currently operates, and determine whether to configure the non-CAP hybrid device as an access point or a relay. If the preferred channel of the non-CAP hybrid device matches the channel on which the CAP currently operates, the non-CAP hybrid device can be configured as a relay (e.g., the WLAN AP module and the WLAN STA module of the non-CAP hybrid device can be switched ON). If the preferred channel of the non-CAP hybrid device does not match the channel on which the CAP currently operates, the non-CAP hybrid device can be configured as an access point (e.g., the WLAN AP module can be switched ON and the WLAN STA module can be switched OFF). From block 508, the flow ends.

On determining the personality of the non-CAP hybrid device, the configuration unit 106 may try to avoid switching the WLAN AP module ON and OFF frequently (e.g., in cases where the personality of the non-CAP hybrid device could be affected by the selected thresholds of the WLAN 2.4 GHz SSID1 signal strength measured) because this could cause service interruption (e.g., because connected WLAN STAs may need to re-associate with other access points). As will further be discussed below, the personality of the non-CAP hybrid device (also referred to as "second-level personality") can be determined based, at least in part, on the quality of the WLAN connection to the CAP ("WLAN connection quality"), the quality of the PLC connection to the CAP ("PLC connection quality"), the 2.4 GHz WLAN coverage, and/or the 5 GHz WLAN coverage.

In some embodiments, the non-CAP hybrid device can be a single band single radio (SBSR) device. The SBSR device can be a WLAN device that is configured only to operate in a single communication band (e.g., either the 2.4 GHz WLAN communication band or the 5 GHz WLAN communication band). In some embodiments, the communication band in which the SBSR device can operate may be determined during manufacturing. In general, the WLAN STA module of the non-CAP hybrid device can be switched ON if the WLAN connection to the CAP is adequate (e.g., if the signal strength detected from the CAP at the non-CAP hybrid device is greater than a threshold signal strength). Also, the WLAN AP module of the non-CAP hybrid device can be switched ON if the 2.4 GHz WLAN coverage is weak or moderate. The WLAN AP module of the non-CAP hybrid device can be switched OFF if both the WLAN connection quality and PLC connection quality are weak. Typically, if the WLAN connection quality is adequate in the 2.4 GHz communication band, the 2.4 GHz WLAN coverage may be moderate or good.

In some embodiments, for a 2.4 GHz single band single radio device, the WLAN STA module and the WLAN AP module of the non-CAP hybrid device typically operate on the same communication channel. This means the WLAN AP module of the non-CAP hybrid device may be required to operate on the communication channel on which the WLAN STA module of the non-CAP hybrid device operates. However, if the WLAN STA module is switched OFF, the WLAN AP module can choose a different communication channel. Accordingly, in some embodiments (e.g., to extend 2.4 GHz WLAN coverage), the WLAN STA module may be switched OFF (even if the WLAN reception is good) to cause the WLAN AP module to select another communication channel that is more performance efficient for the WLAN AP module. This can result in a trade-off between the connectivity of the non-CAP hybrid device and an increased range/capacity. In some embodiments, if the 2.4 GHz WLAN coverage is good, if the non-CAP hybrid device has a choice to switch ON the WLAN AP module, and if the WLAN AP module uses a different channel than the CAP, then switching ON the WLAN AP module can increase the capacity of the hybrid communication network at the expense of reducing the possibility of channel reuse with network devices in neighboring networks.

In some embodiments, the CAP can be a dual band single radio (DBSR) device with a fixed operating band. A DBSR device can be a WLAN device that can operate in either the 2.4 GHz WLAN communication band or the 5 GHz WLAN communication band, but not simultaneously. If the CAP is a DBSR device, the non-CAP hybrid device can use a management information base (MIB) setting to select the band of operation when the non-CAP hybrid device detects the DBSR CAP in the hybrid communication network. In some embodiments, the MIB default setting can be the 2.4 GHz WLAN communication band. In some embodiments, the 5 GHz WLAN communication band can also be selected. As discussed above, if the CAP is a single band single radio (SBSR) device, the non-CAP hybrid device can select the same communication band and communication settings (e.g., SSID, security settings, etc.) as the CAP. If the non-CAP hybrid device selects the 2.4 GHz WLAN communication band, the non-CAP hybrid device (e.g., the configuration unit 106) can execute operations described above to determine the personality of the non-CAP hybrid device. Otherwise, if the non-CAP hybrid device selects the 5 GHz WLAN communication band, the non-CAP hybrid device (e.g., the configuration unit 106) can execute operations described below to determine the personality of the non-CAP hybrid device.

In some embodiments, the non-CAP hybrid device can be a dual band dual concurrent (DBDC) device. A DBDC device can be a WLAN device that can simultaneously operate in the 2.4 GHz WLAN communication band and the 5 GHz WLAN communication band. The second-level personality of the non-CAP hybrid device can be assigned depending on the WLAN connection quality to the CAP, the PLC connection quality to the CAP, and/or the 2.4 GHz WLAN coverage. In some embodiments, the 5 GHz WLAN coverage can be taken into consideration while determining the second-level personality of the DBDC non-CAP hybrid device. It should be noted that if the CAP is also a DBDC device, the non-CAP hybrid device can operate in the two communication bands (e.g., the 2.4 GHz and the 5 GHz WLAN communication bands) independently of each other such that the WLAN AP modules in none, one, or both the WLAN communication bands may be active and the operating channels may be selected independently. However, if the CAP is an SBSR device, the non-CAP hybrid device can configure both the communication bands with the same communication credentials (e.g., SSID/security) as the CAP. In general, the WLAN STA module of the non-CAP hybrid device can attempt to connect to the CAP via the 2.4 GHz or the 5 GHz WLAN communication band (whichever has the better connectivity) and can switch ON the WLAN AP device to transmit on the 2.4 GHz WLAN communication band, to improve the 2.4 GHz WLAN coverage, and to transmit on the 5 GHz WLAN communication band after the 2.4 GHz WLAN communication band is filled/occupied. A non-CAP DBDC hybrid device may be assigned multiple personalities—one for each communication band on which the non-CAP hybrid device is configured to operate. In some embodiments, the non-CAP hybrid device can be configured differently for the same WLAN and PLC input conditions.

The second-level personality can be assigned to the non-CAP hybrid device depending on the WLAN connection quality to the CAP, the PLC connection quality to the CAP, and/or the 5 GHz WLAN coverage. In general, the WLAN STA module of the non-CAP hybrid device can be switched ON if the WLAN connection quality to the CAP is adequate. The WLAN AP module of the non-CAP hybrid device can be switched ON if there is good WLAN or PLC connection to the network gateway 124. Typically, the number of channels in the 5 GHz band is large and therefore, channel reuse may not be a concern as in the 2.4 GHz band.

As discussed above, in some embodiments, the configuration unit 106 can use a suitable channel scan/selection algorithm (e.g., an enhanced automatic channel selection (EACS) algorithm) to select a preferred channel on which the WLAN AP module of the non-CAP hybrid device should operate. For example, the configuration unit 106 can select a channel associated with the best performance. For each WLAN communication band, the EACS algorithm can indicate a list of candidate channels that have a good performance (e.g., candidate channels that exceed a threshold performance) and the candidate channels can be ordered based on preference/performance. The channel selection algorithm can also indicate, for each channel on the candidate list, a list of detected service set identifiers (SSID), a list of detected basic service set identifiers (BSSID), and a channel utilization of the channel. In some embodiments, the configuration unit 106 can select a channel that does not comprise other active access points. In other embodiments, the configuration unit 106 can select a communication channel that comprises active access points associated with a low RSSI. In some embodiments, as discussed above, if it is determined that the WLAN AP module of the non-CAP hybrid device should be switched ON, the non-CAP hybrid device (e.g., the configuration unit 106) can select a preferred channel on which the WLAN AP module should operate. However, in other embodiments, the non-CAP hybrid device (e.g., the configuration unit 106) may also select a second preferred channel (e.g., if the preferred channel is the same as the channel on which the CAP operates). In other embodiments, other suitable channel selection procedures can be executed to determine one or more channels in which the WLAN AP module of the non-CAP hybrid device should operate.

In some embodiments, when executing operations to select a channel, the non-CAP hybrid device (e.g., the configuration unit 106) may apply a penalty to a primary channel currently used by the CAP and may avoid using the secondary channel used by the CAP. This can ensure that the configuration unit 106 selects a channel that is different from the primary and the secondary channels selected by the CAP (to avoid interference with the CAP). After the non-CAP PCBP selection operations (described in FIG. 5) are executed, if the WLAN AP module of the non-CAP hybrid device is switched OFF, if the WLAN STA module of the non-CAP hybrid device is switched ON, and if the WLAN STA module of the non-CAP hybrid device is connected to and associated with an access point that is not the CAP of the hybrid communication network, the non-CAP hybrid device is deemed to be operating in mode B. Otherwise, the non-CAP hybrid device is deemed to be operating in mode A. As will be further discussed below, the monitoring unit 108 can execute different monitoring operations depending on whether the non-CAP hybrid device is operating in mode A or mode B.

After the CAP BCP selection operations and the non-CAP PBCP selection operations described above in FIGS. 2-5 are executed and the personality of the hybrid device is determined, the monitoring unit 108 can perform monitoring procedures further described below. The monitoring unit 108 can monitor (e.g., continuously, at periodic intervals, etc.) the hybrid communication network 100 and the device status to detect any changes that could affect the personality and configuration of the hybrid device 102. For example, the user may unplug or move a network device in the hybrid communication network 100, radio conditions may change, the PLC connection quality may change, the WLAN connection quality may change, etc. As another example, the Ethernet cable of the hybrid device 102 may be connected or a previously connected Ethernet cable may be disconnected. As another example, the existing CAP of the hybrid communication network 100 may be unreachable or may change. If the monitoring unit 108 detects a change in the hybrid communication network 100, the monitoring unit 108 can cause the configuration unit 106 to re-execute the operations for determining the personality of the hybrid device 102 to determine if the change in the hybrid communication network results 100 in a change in the personality of the hybrid device 102. For example, the operations for determining the personality of the hybrid device 102 may be re-executed to determine if there is a new CAP in the hybrid communication network 100, if the configuration of the WLAN AP and STA modules of the hybrid device 102 should be changed, etc. However, the monitoring unit 108 may be configured to ensure that the operations for determining the personality of the hybrid device 102 are not re-executed too often, thus ensuring that the personality of the hybrid device 102 does not oscillate between two or more values. Built-in hysteresis in the time domain and analysis of performance measurements (e.g., PLC data rate, WLAN data rate, etc.) can be used to achieve stability and a reasonable reaction time to changes that could impact network performance.

As discussed above, if the WLAN AP module of the non-CAP hybrid device is switched OFF, if the WLAN STA module of the non-CAP hybrid device is switched ON, and if the WLAN STA module of the non-CAP hybrid device is connected to and associated with an access point that is not the CAP of the hybrid communication network, the non-CAP hybrid device is deemed to be configured in mode B. Otherwise, the non-CAP hybrid device is deemed to be configured in mode A. In some embodiments, if the hybrid device is configured in mode A, the hybrid device (e.g., the monitoring unit 108) can perform monitoring procedures periodically (e.g., every TCA_periodic_timer seconds) and at least once (e.g., at a randomly selected or predetermined time instant) within the periodic time interval (e.g., within the time interval indicated by TCA_periodic_timer). However, if the hybrid device is configured in mode B, the hybrid device (e.g., the monitoring unit 108) can perform the monitoring procedures as described, except that the performance/quality of the WLAN connection can be measured between the WLAN STA module of the hybrid device and the associated access point (and not the CAP).

It should be understood that FIGS. 1-5 and the operations described herein are examples meant to aid in understanding embodiments and should not be used to limit embodiments or limit scope of the claims. Embodiments may perform additional operations, fewer operations, operations in a different order, operations in parallel, and some operations differently. For example, if the non-CAP hybrid device receives a command/message from the CAP requesting that the WLAN AP module of the non-CAP hybrid device should be switched OFF, the WLAN AP module of the non-CAP hybrid device may stop transmitting/receiving until the WLAN AP module receives a broadcast message indicating that the CAP is in operation and that the WLAN AP module can be switched ON. After receiving the broadcast message indicating that the CAP is in operation, the non-CAP hybrid device can wait for a random time period and then re-start executing the non-CAP PBCP selection operations discussed herein in FIG. 5.

In some embodiments, the communication channel with the preferred performance can be selected as the communication channel with a best value of a predetermined parameter. For example, a communication channel that does not comprise other active access points may be selected. As another example, a communication channel that comprises active access points associated with a low RSSI may be selected. In other embodiments, the communication channel with the preferred performance can be selected based on a combination of multiple parameters.

Although examples refer to determining the personality of the non-CAP hybrid device based on the WLAN connection quality to the CAP, the PLC connection quality to the CAP, the 2.4 GHz (and/or the 5 GHz) WLAN coverage, embodiments are not so limited. In other embodiments, in addition to the aforementioned inputs, the operations for determining the personality of the non-CAP hybrid device can also take into consideration whether the non-CAP hybrid device is connected to an end-device. For example, if the non-CAP hybrid device is connected to an end-device (e.g. an Ethernet device) that will consume data generated by (or relayed by) the non-CAP hybrid device, the non-CAP hybrid device may choose to establish redundant upstream links over improving WLAN coverage.

In some embodiments, if there are multiple access points in the hybrid communication network, the configuration unit 106 can determine the communication channel and/or the communication band on which an access point should operate. For example, if two access points are far away from each other (e.g., separated by at least a threshold distance), the access points may reuse the same communication channel or use a different channel (if possible). As another example, if the two access points are close to each other, the access points may use a different channel. As another example, if the two access points are very close together (e.g. separated by a few feet), then the access points may transmit on different communication bands (e.g., one of the access points may use the 2.4 GHz communication band while the other access point may use the 5 GHz communication band).

In some embodiments, the hybrid device 102 can implement one or more indicators (e.g., LED indictors) to indicate different statuses of the hybrid device 102. In some embodiments, the hybrid device 102 may comprise a power/status/security LED, an Ethernet port status LED, a WLAN port status LED, a PLC port status LED, etc. For example, the power/status/security LED can be a dual color LED (e.g., a green and red LED). The power/status/security LED may blink green during device booting or when WLAN or PLC connection operations (e.g., Wi-Fi protected setup (WPS)/PLC simple connect operations) are being executed. The power/status/security LED may be solid red if there is a boot up failure. The power/status/security LED may be OFF if the device is not powered up. As another example, the Ethernet port status LED can be a green LED, can display solid green when the Ethernet communication link is established, can blink green if the Ethernet is active, and can be OFF if the Ethernet communication link is not established. As another example, the WLAN port status LED can be a green LED that can display solid green when the WLAN communication link is established, blink green if the WLAN is active, and can be OFF if the WLAN communication link is not established. As another example, the PLC port status LED can be a dual color (e.g., green and yellow) LED. The PLC port status LED can be solid green if the PLC link is established and the quality of the PLC link is better than a quality threshold. The PLC port status LED can blink green if PLC is active. The PLC port status LED can be solid yellow if the PLC link is established and the quality of the PLC link is poorer than the quality threshold. The PLC port status LED can be OFF if the PLC link is not established. In some embodiments, the hybrid devices can comprise two sets of LEDs—one that indicates the status of the WLAN STA module of the hybrid device and another that indicates the status of the WLAN AP module of the hybrid device. For example, if the WLAN STA module and the WLAN AP module are switched OFF, the power/status/security LED may be configured to blink red.

In some embodiments, the WLAN STA module of the non-CAP hybrid device may not necessarily associate with the CAP. In other embodiments, (e.g., if a non-CAP access point provides better performance than the CAP), the WLAN STA module of the non-CAP hybrid device may associate with the non-CAP access point that provides the best performance. In some embodiments, all the access points in the hybrid communication network may transmit at their respective maximum transmission power and each hybrid device may execute the configuration operations described above to configure one or more network interfaces of the hybrid device. However, in other embodiments, the hybrid communication network may comprise a centralized network device that performs global optimization on the entire communication network, determines how to configure each network interface of each hybrid device in the hybrid communication network (for optimal performance), and also performs power control for each access point in the hybrid communication network. In some embodiments, the hybrid devices may support communication on the 2.4 GHz band, the 5 GHz band, or both the communication bands. The hybrid devices may be configured to broadcast communication band capabilities irrespective of the communication band on which the hybrid device is currently operating. For example, the hybrid device may transmit notification indicating that it supports communication on the 2.4 GHz band and the 5 GHz band even though the hybrid device may only be transmitting on the 2.4 GHz band.

Although FIGS. 1-5 describe operations for configuring the WLAN interfaces of the hybrid devices, embodiments are not so limited. In other embodiments, the operations described herein can be executed to configure network interfaces that implement other suitable types of communication protocols and technologies (e.g., a PLC interface). Although the Figures describe example operations for establishing a PLC link between hybrid devices (e.g., between the hybrid device 102 and the CAP), configuring the hybrid device based, at least in part, on the PLC connection quality to the CAP, etc., embodiments are not so limited. In other embodiments, a communication link between the CAP and another suitable network interface of the hybrid device 102 may be established (e.g., WLAN, Ethernet, MoCA, etc.). Furthermore, the quality of other suitable communication links to the CAP may be used to determine how to configure the hybrid device 102. For example, the configuration of the hybrid device 102 may be determined based on a WLAN connection quality, WLAN coverage, speed of an Ethernet connection to the CAP, quality/speed of a MoCA connection to the CAP, and/or the quality/speed of other wired or wireless communication links to the CAP.

Although some examples describe the CAP as a network device that is directly connected to the network gateway 124 via Ethernet, embodiments are not so limited. In other embodiments, a network device that is designated as the CAP may connect to the network gateway 124 via another suitable communication protocol (e.g., PLC, MoCA, etc.). Furthermore, although some examples describe the CAP as being distinct from the network gateway 124, embodiments are not so limited. In some embodiments, functionality of the CAP may be integrated within the network gateway 124. The network gateway 124 (and consequently the CAP) may have any suitable wired or wireless backhaul, such as long-term evolution (LTE) communication protocols, digital subscriber line communication protocols (xDSL), etc., to communicatively connect to a wide area network (WAN). In some embodiments, a network device (e.g., the network gateway 124 with integrated CAP functionality) may be selected as the CAP in response to determining that the network device is coupled to the WAN via a communication technology, such as LTE and/or xDSL. Furthermore, in some embodiments, the CAP may not be dynamically selected. Instead, a network device may be preconfigured as the CAP of the network based, at least in part, on being configured as the network gateway and implementing WAN-based communication technologies such as LTE and/or xDSL).

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
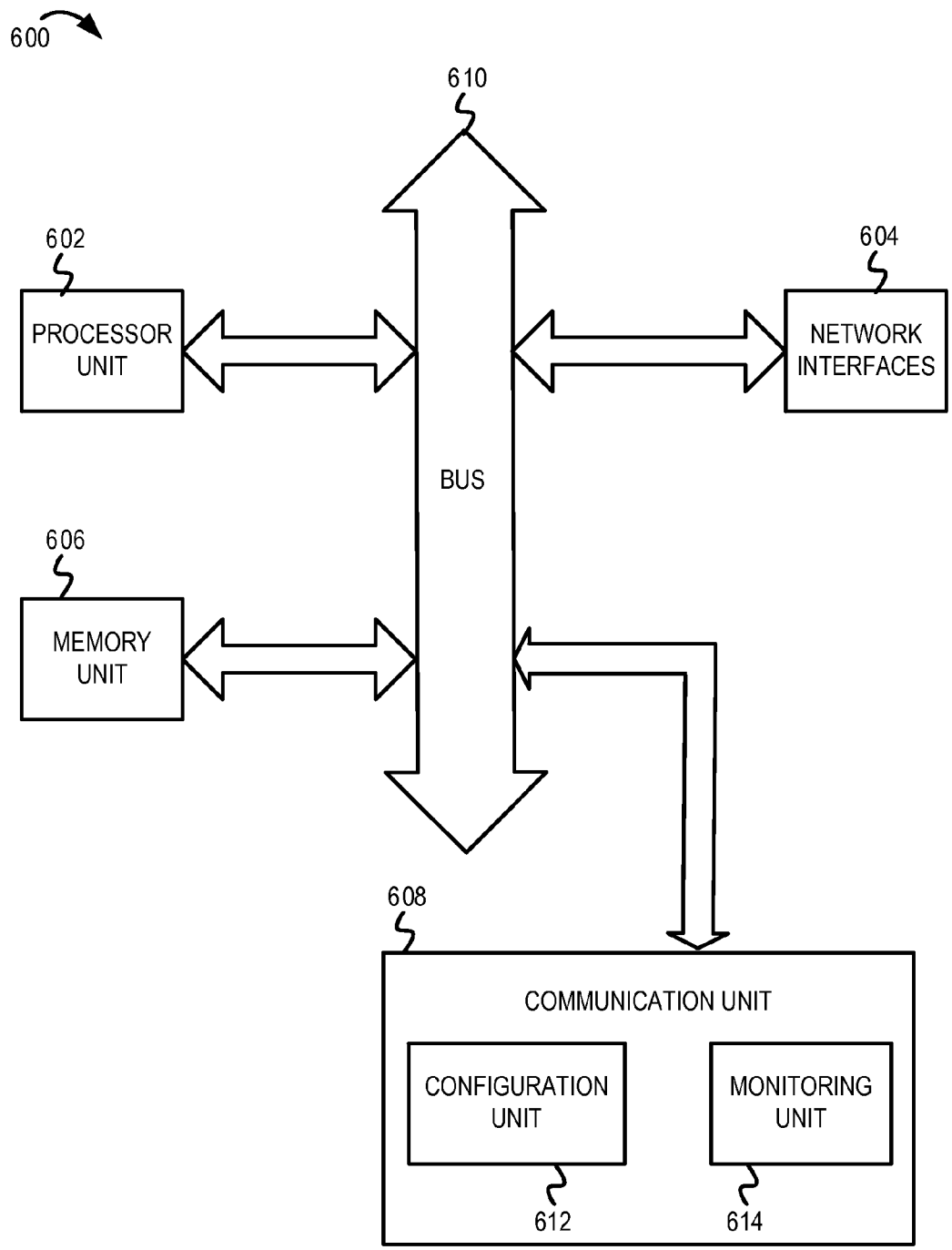
FIG. 6 is a block diagram of one embodiment of an electronic device including a mechanism for automatic configuration of the electronic device.

FIG. 6 is a block diagram of one embodiment of an electronic device 600 including a mechanism for automatic configuration of the electronic device 600. In some embodiments, the electronic device 600 can be a laptop computer, a tablet computer, a netbook, a mobile phone, a smart appliance, a gaming console, a desktop computer, or other suitable electronic device comprising communication capabilities. In some embodiments, the electronic device 600 can be a hybrid device that comprises multiple network interfaces 604, each of which couples the electronic device 600 to different communication network segments (or access technologies). The electronic device 600 includes a processor unit 602 (possibly including multiple processors, multiple cores, multiple nodes, and/or implementing multi-threading, etc.). The electronic device 600 includes a memory unit 606. The memory unit 606 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of computer-readable storage media. The electronic device 600 also includes a bus 610 (e.g., PCI, ISA, PCI-Express, HyperTransport®, InfiniBand®, NuBus, AHB, AXI, etc.), and network interfaces 604 that include at least one of a wireless network interface (e.g., a WLAN interface, a Bluetooth® interface, a WiMAX interface, a ZigBee® interface, a Wireless USB interface, etc.) and a wired network interface (e.g., a powerline communication interface, an Ethernet interface, etc.).

The electronic device 600 also includes a communication unit 608. The communication unit 608 comprises a configuration unit 612 and a monitoring unit 614. The configuration unit 612 can execute functionality described above with reference to FIGS. 1-5 to determine a personality, operating band, operating channel, transmit power, and/or other operating conditions of the electronic device 600. The configuration unit 612 can determine whether a WLAN module of the electronic device 600 is a central access point. If not, the configuration unit 612 can determine whether to switch a WLAN AP module and/or a WLAN STA module of the electronic device 600 ON or OFF. The monitoring unit 614 can execute operations described above to determine whether to re-execute the operations for determining the personality of the electronic device 600. Any one of these functionalities may be partially (or entirely) implemented in hardware and/or on the processor unit 602. For example, the functionality may be implemented with an application specific integrated circuit, in logic implemented in the processor unit 602, in a co-processor on a peripheral device or card, etc. Further, realizations may include fewer or additional components not illustrated in FIG. 6 (e.g., video cards, audio cards, additional network interfaces, peripheral devices, etc.). For example, the communication unit 608 may comprise one or more additional processors that are distinct from the processor unit 602 coupled with the bus 610. The processor unit 602, the memory unit 606, and the network interfaces 604 are coupled to the bus 610. Although illustrated as being coupled to the bus 610, the memory unit 606 may be coupled to the processor unit 602.

While the embodiments are described with reference to various implementations and exploitations, it will be understood that these embodiments are illustrative and that the scope of the inventive subject matter is not limited to them. In general, techniques for automatic configuration of a hybrid device as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for network device configuration, the method comprising:
   determining whether a first network device is coupled to a gateway of a communication network via a first communication interface of the first network device and whether a wide area network is accessible to the first network device via the first communication interface;
   determining that the first network device is a central access point of the communication network based, at least in part, on the first network device being coupled to the gateway via the first communication interface and the wide area network being accessible to the first network device via the first communication interface; and
   in response to determining that the first network device is the central access point, determining an operating parameter for configuring the first network device.

2. The method of claim 1, wherein the first network device further includes a second communication interface, wherein the first communication interface and the second communication interface use a same communication protocol.

3. The method of claim 1, wherein the first network device further includes a second communication interface, wherein the first communication interface and the second communication interface use different communication protocols.

4. The method of claim 1, further comprising:
   determining that the first network device is not the central access point; and
   determining how to configure the first network device based, at least in part, on a performance measurement associated with the first network device.

5. The method of claim 4, wherein determining how to configure the first network device comprises determining whether to configure the first network device as an access point, a client station, or a relay device.

6. The method of claim 4, wherein the performance measurement associated with the first network device includes at least one member selected from the group consisting of a quality of a wireless communication link between the first network device and the central access point, a quality of a powerline communication (PLC) link between the first network device and the central access point, and a quality of wireless coverage at the first network device.

7. The method of claim 6, wherein,
   the quality of the wireless communication link between the first network device and the central access point is a signal strength of a wireless signal received from the central access point at a wireless network interface of the first network device, and
   the quality of the PLC link between the first network device and the central access point is a signal strength of a powerline signal received from the central access point at a powerline network interface of the first network device.

8. The method of claim 6, wherein,
   the quality of wireless coverage at the first network device is a maximum of a plurality of signal strength values measured at a wireless network interface of the first network device from a plurality of access points of the communication network, wherein the central access point is one of the plurality of access points.

9. The method of claim 4, wherein determining how to configure the first network device comprises at least one member selected from the group consisting of:
   determining whether to enable or disable an access point module of the first network device, and
   determining whether to enable or disable a client station module of the first network device.

10. The method of claim 4, wherein determining how to configure the first network device is further based on a number of communication hops between the first network device and the central access point.

11. The method of claim 4, wherein determining how to configure the first network device comprises determining whether to:
   configure the first network device as an access point by activating an access point module of the first network device and disabling a client station module of the first network device,
   configure the first network device as a sink device by disabling the access point module and activating the client station module, configure the first network device as a relay device by activating both the access point module and the client station module, or disable wireless communications of the first network device by disabling both the access point module and the client station module.

12. The method of claim 4, wherein determining how to configure the first network device comprises:
determining whether to configure the first network device as an access point; and
configuring an access point module of the first network device to operate on the same communication channel as the central access point in response to determining to configure the first network device as an access point.

13. The method of claim 4, further comprising:
monitoring the performance measurement associated with the first network device to determine whether to re-execute operations for determining how to configure the first network device.

14. The method of claim 1, wherein said determining that the first network device is coupled to the gateway via the first communication interface comprises determining that a wired interface of the first network device is coupled to the gateway over one communication hop.

15. The method of claim 1, further comprising:
determining that the first network device is not the central access point based, at least in part, on an Ethernet interface of the first network device being coupled to the gateway over two or more communication hops.

16. The method of claim 1, wherein said determining whether that the first network device is coupled to the gateway via the first communication interface comprises determining that an Ethernet interface of the first network device is coupled to the gateway over one communication hop via an Ethernet communication medium.

17. The method of claim 1, further comprising:
determining whether a dynamic host configuration protocol (DHCP) server is accessible from the first communication interface,
wherein said determining that the first network device is the central access point, is further based on the DHCP server being accessible from the first communication interface.

18. The method of claim 1, wherein the first network device comprises a plurality of network interfaces that couple the first network device to a corresponding plurality of communication media.

19. The method of claim 1, further comprising:
configuring the first network device using the operating parameter; and
monitoring the communication network to determine whether to change a configuration of the first network device.

20. The method of claim 1, wherein the operating parameter comprises at least one member selected from the group consisting of an operating communication band, an operating communication channel, and a transmit power.

21. The method of claim 1, wherein, in response to determining that the first network device is the central access point, further comprising:
determining that the communication network includes a legacy access point; and
configuring the first network device based, at least in part, on the operating parameter associated with the first network device and an operating parameter associated with the legacy access point.

22. The method of claim 1, wherein determining the operating parameter comprises:
identifying an operating communication band on which the first network device is configured to operate;
selecting an operating communication channel within the operating communication band; and
configuring the first network device to communicate using the operating communication channel.

23. The method of claim 22, further comprising:
selecting a transmit power level for communications from the central access point on the operating communication channel.

24. The method of claim 1, further comprising:
determining that the first network device is not the central access point;
determining whether the first network device received an indication identifying the central access point; and
in response to determining that the first network device has not received the indication,
broadcasting a message in the communication network to identify the central access point and to determine communication credentials of the central access point.

25. The method of claim 1, further comprising:
determining that the first network device is not the central access point;
establishing a communication link between the first network device and the central access point based, at least in part, on communication credentials received from the central access point; and
determining how to configure the first network device after establishing the communication link between the first network device and the central access point.

26. The method of claim 1, further comprising:
determining that the first network device is not the central access point; and
determining the operating parameter associated with the first network device based, at least in part, on an operating parameter associated with the central access point and a configuration of the first network device.

27. The method of claim 1, further comprising:
determining whether to enable bridging operations of a network interface of the first network device.

28. The method of claim 1, wherein determining how to configure the first network device comprises:
determining whether to configure the first network device as a relay device; and
activating a client station module of the first network device and an access point module of the first network device in response to determining to configure the first network device as a relay device.

29. The method of claim 1, further comprising:
monitoring the communication network to determine whether to re-execute operations for determining whether the first network device is the central access point.

30. A first network device comprising:
a processor; and
a configuration unit coupled with the processor, the configuration unit configured to:
determine whether the first network device is coupled to a gateway of a communication network via a first communication interface of the first network device and whether a wide area network is accessible to the first network device via the first communication interface;

determine that the first network device is a central access point of the communication network based, at least in part, on the first network device being coupled to the gateway via the first communication interface and the wide area network being accessible to the first network device via the first communication interface; and in response to determining that the first network device is the central access point, determine an operating parameter for configuring the first network device.

31. The first network device of claim 30, wherein the configuration unit is further configured to:

determine that the first network device is not the central access point; and determine how to configure the first network device based, at least in part, on a performance measurement associated with the first network device.

32. The first network device of claim 31, wherein the performance measurement associated with the first network device includes at least one member selected from the group consisting of a quality of a wireless communication link between the first network device and the central access point, a quality of a powerline communication (PLC) link between the first network device and the central access point, and a quality of wireless coverage at the first network device.

33. The first network device of claim 31, wherein the configuration unit is further configured to determine how to configure the first network device based on a number of communication hops between the first network device and the central access point.

34. The first network device of claim 31, wherein the configuration unit is further configured to determine whether to:

configure the first network device as an access point by activating an access point module of the first network device and disabling a client station module of the first network device, configure the first network device as a sink device by disabling the access point module and activating the client station module, configure the first network device as a relay device by activating both the access point module and the client station module, or disable wireless communications of the first network device by disabling both the access point module and the client station module.

35. The first network device of claim 31, wherein the configuration unit is further configured to:

determine whether to configure the first network device as an access point; and configure an access point module of the first network device to operate on the same communication channel as the central access point in response to determining to configure the first network device as an access point.

36. The first network device of claim 31, further comprising a monitoring unit coupled with at least the processor, the monitoring unit configured to monitor the communication network to determine whether to re-execute operations for determining how to configure the first network device.

37. A non-transitory machine-readable storage medium having machine executable instructions stored therein, the machine executable instructions comprising instructions to:

determine whether a first network device is coupled to a gateway of a communication network via a first communication interface of the first network device and whether a wide area network is accessible to the first network device via the first communication interface;

determine that the first network device is a central access point of the communication network based, at least in part, on the first network device being coupled to the gateway via the first communication interface and the wide area network being accessible to the first network device via the first communication interface; and in response to determining that the first network device is the central access point, determine an operating parameter for configuring the first network device.

38. The non-transitory machine-readable storage medium of claim 37, wherein said instructions further comprise instructions to:

determined that the first network device is not the central access point; and determine how to configure the first network device based, at least in part, on a performance measurement associated with the first network device.

39. The non-transitory machine-readable storage medium of claim 38, wherein said instructions to determine how to configure the first network device further comprise instructions to determine a number of communication hops between the first network device and the central access point.

40. The non-transitory machine-readable storage medium of claim 38, wherein, said instructions to determine how to configure the first network device further comprise instructions to determine whether to:

configure the first network device as an access point by activating an access point module of the first network device and disabling a client station module of the first network device, configure the first network device as a sink device by disabling the access point module and activating the client station module, configure the first network device as a relay device by activating both the access point module and the client station module, or disable wireless communications of the first network device by disabling both the access point module and the client station module.

41. The non-transitory machine-readable storage medium of claim 38, wherein said instructions to determine how to configure the first network device further comprise instructions to:

determine whether to configure the first network device as an access point; and configure an access point module of the first network device to operate on the same communication channel as the central access point in response to determining to configure the first network device as an access point.

42. The non-transitory machine-readable storage medium of claim 38, wherein said instructions further comprise instructions to:

monitor the communication network to determine whether to re-execute operations for determining how to configure the first network device.

* * * * *